United States Patent
Graesser

(10) Patent No.: US 6,517,253 B1
(45) Date of Patent: Feb. 11, 2003

(54) CONNECTOR FOR OPTICAL WAVEGUIDES COMPRISING A CONNECTOR HOUSING

(75) Inventor: Edmond Graesser, Grunstadt (DE)

(73) Assignee: Raco Electronic Data Technology, Grunstadt (DE)

( * ) Notice: Subject to any disclaimer, the term of this patent is extended or adjusted under 35 U.S.C. 154(b) by 0 days.

(21) Appl. No.: 09/868,409

(22) PCT Filed: Dec. 21, 1999

(86) PCT No.: PCT/EP99/10251

§ 371 (c)(1),
(2), (4) Date: Jun. 14, 2001

(87) PCT Pub. No.: WO00/37979

PCT Pub. Date: Jun. 29, 2000

(30) Foreign Application Priority Data

Dec. 22, 1998 (DE) .......................................... 198 59 351
Jan. 12, 1999 (DE) .......................................... 199 00 781

(51) Int. Cl.[7] ................................................ G02B 6/38
(52) U.S. Cl. ........................... 385/58; 385/55; 385/136; 385/137
(58) Field of Search ......................... 385/53–59, 60–65, 385/134–139

(56) References Cited

U.S. PATENT DOCUMENTS 5,037,175 A    8/1991   Weber
5,071,219 A   12/1991   Yurtin et al.
5,315,679 A    5/1994   Baldwin et al.

FOREIGN PATENT DOCUMENTS

WO        8805925       8/1988

*Primary Examiner*—Khiem Nguyen
(74) *Attorney, Agent, or Firm*—Horst M. Kasper

(57) ABSTRACT

The invention relates to a connector (1, 101) for optical waveguides, with a connector housing (2, 102) at whose one end (3, 103) a fiber optic cable (4) is inserted and at whose opposite end (5, 105) ferrules (6, 7) exit, which are each encapsulated in a first inner ferrule individual housing (8, 9) which, on the outsides of its housing (10, 11), has locking means (12, 13), each of which interacts with a locking counter-element (14, 15) of the connector counter-coupling (16). The inner ferrule individual housings (8, 9) are each held in an outer ferrule individual housing (17, 18) and are relatively movable thereto in the axial direction, said outer ferrule individual housing being accommodated in the connector housing (2, 102) such that it is movement-coupled and has means (19, 20) with which the lock between the inner ferrule individual housing (8, 9) and the locking counter-element (14, 15) of the connector counter-coupling (16) can be released by axially moving the outer ferrule individual housing (17, 18) with respect to the inner ferrule individual housing (8, 9) in the direction of the cable insertion end (3, 103). Between the fiber optic cable (4) and the inner ferrule individual housing (8, 9), a movement-coupled connection (21, 22, 23, 121, 122, 123) is formed, which can be an additional housing.

18 Claims, 14 Drawing Sheets

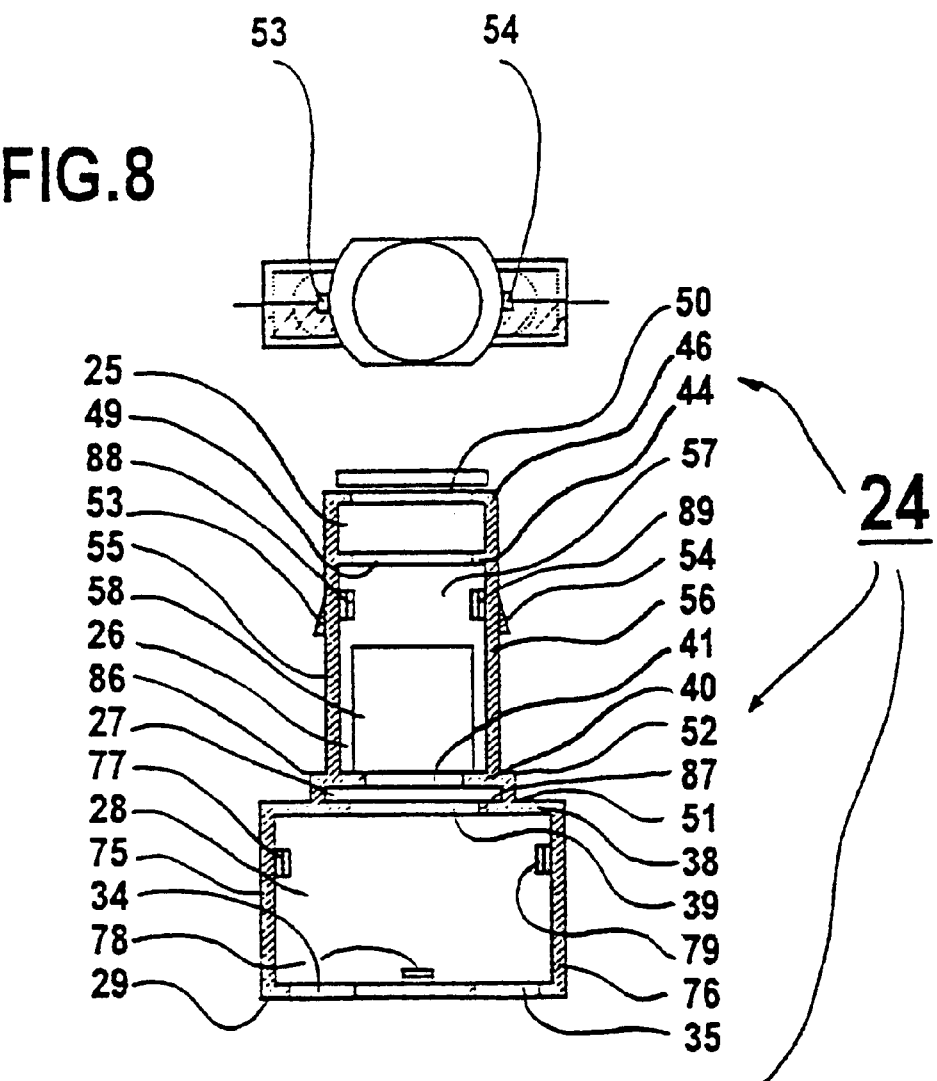

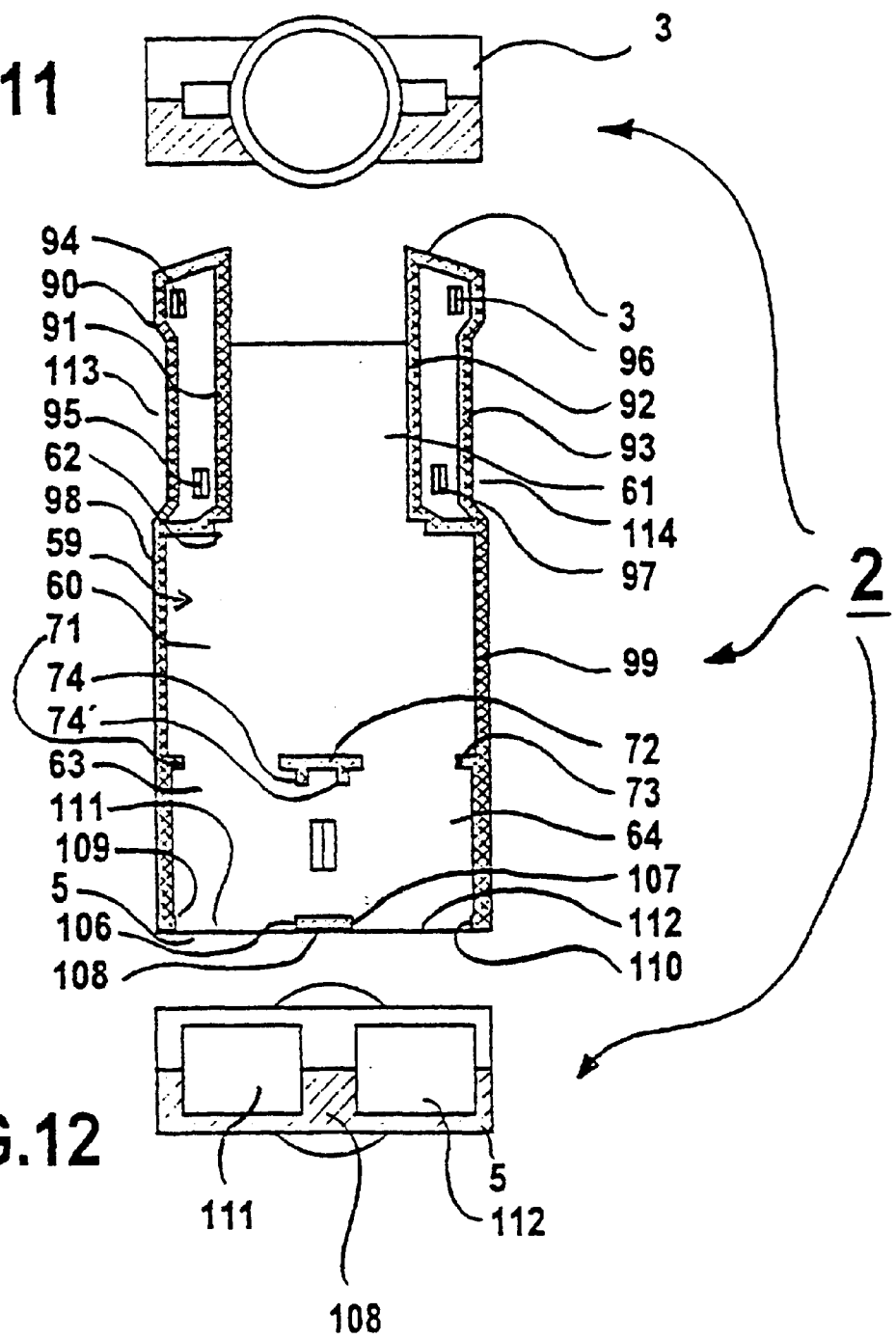

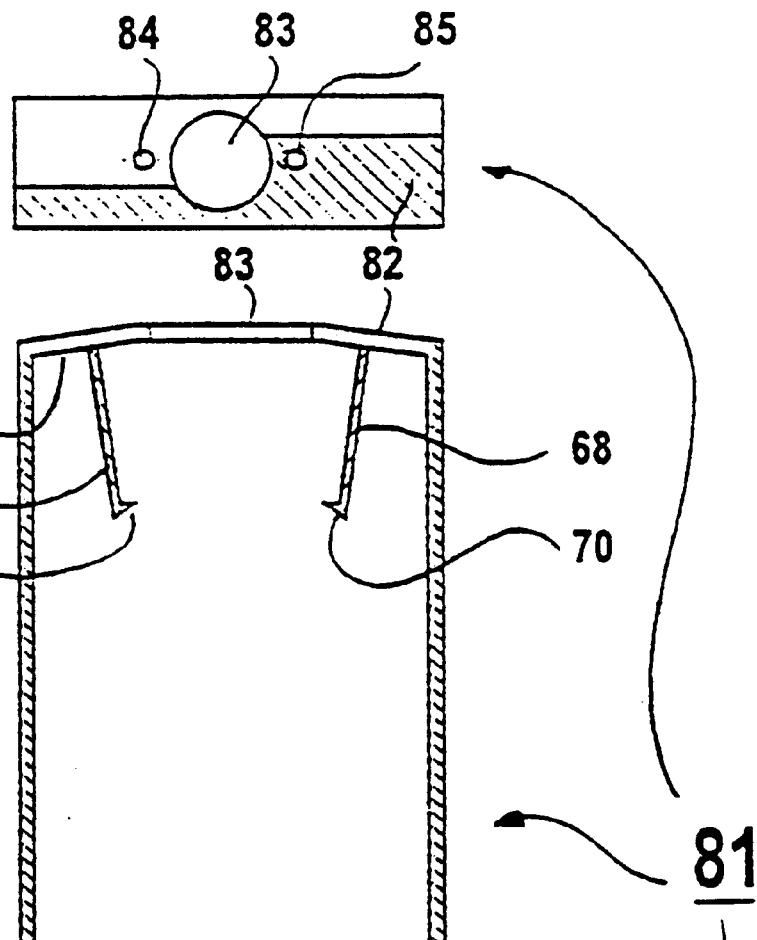
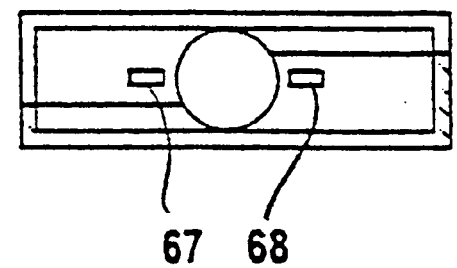
FIG.14
FIG.13
FIG.15

CONNECTOR FOR OPTICAL WAVEGUIDES
COMPRISING A CONNECTOR HOUSING

TECHNICAL AREA

The invention relates to a connector for optical waveguides, with a connector housing at whose one end a fiber optic cable is inserted and at whose opposite end ferrules exit, which are each encapsulated in an inner ferrule individual housing which, on the outsides of the housing, has locking means, each of which interacts with a locking counter-element of a connector counter-coupling, whereby the inner ferrule individual housings are each held in an outer ferrule individual housing and are movable in the axial direction with respect thereto, said outer ferrule individual housing being accommodated in the connector housing such that it is movement-coupled and has means with which the lock between the inner ferrule individual housing and the locking counter-element of the connector counter-coupling can be released by axially moving the outer ferrule individual housing with respect to the inner ferrule individual housing in the direction of the cable insertion end, according to the generic part of claim 1.

STATE OF THE ART

Connectors of the type described above offer better protection again inadvertent unplugging of the connector through improper handling. However, it has been found that the release mechanism can also be released by pulling firmly on the fiber optic cable itself. Due to the frictional or non-positive connection between the connector housing, the cable and the outer ferrule individual housing, such pulling causes a relative movement between the outer ferrule individual housing and the counter-coupling.

TECHNICAL OBJECTIVE

The invention is based on the objective of creating a connector of the above-mentioned type with a reliable unplugging protection means, which cannot be inadvertently unplugged by pulling on the cable.

DISCLOSURE OF THE INVENTION AND ITS ADVANTAGES

This objective is achieved according to the invention with a connector of the above-mentioned technical area in that, between the fiber optic cable and the inner ferrule individual housing, there is a movement-coupled connection that can be moved with respect to the connector housing.

The movement coupling can preferably be effectuated by positive connection measures as well as by frictional connection measures, e.g. by a movement coupler.

In a preferred embodiment of the invention, the movement coupling between the fiber optic cable and the inner ferrule individual housing is created by an indirect positive connection in that, for example, the connector housing accommodates an inner core housing in which the fiber optic cable, on the one hand, and the ferrules, on the other hand, are held in a form-fitting manner, said core housing being arranged in the connector housing so as to be movable in the axial direction. Therefore, between the fiber optic cable and the inner ferrule individual housing, advantageously a movement-coupled connection is formed with respect to the connector housing.

According to the invention, a tensile force that acts on the fiber optic cable is transmitted via the connection, which is movable with respect to the connector housing, to the inner ferrule individual housing and only from there to the outer ferrule individual housing. Thus, the tensile force acting on the fiber optic cable does not move the outer ferrule individual housing relative to the inner ferrule individual housing towards the connector housing, so that the lock between the outer ferrule individual housing and the counter-coupling is not released.

In this manner, it is ensured that, if the fiber optic cable is pulled, the movement sequence of the connector parts is defined in such a way that the release mechanism between the outer ferrule individual housing and the locking elements of the connector counter-coupling cannot go into action. Therefore, according to the invention, the connector can only be released from the counter-coupling by pulling on the connector housing. In contrast, when the cable is pulled, assuming normal tensile forces, the connector remains locked and cannot be released by the counter-coupling since the triggering mechanism is not activated by pulling on the cable.

This characteristic is enhanced by the fact that the movement path in the outer ferrule individual housing for the inner ferrule individual housing that is accommodated so as to be axially movable therein is the same as or smaller than the movement path in the connector housing for the core housing that is accommodated therein and that is axially movable therein.

Advantageously, in one embodiment, the inner core housing is divided into chambers which, in an at least partially form-fitting manner, accommodate, for example, a cable crimping sleeve with a collar that is mounted on the fiber optic cable and the ferrules. Here, the depth of the chamber that accommodates the collar is dimensioned in such a way that the cable crimping sleeve is movement-coupled with the chamber without time delay or path delay, that is to say, it is positively connected to the inner core housing without slippage. The tensile force is essentially introduced via this positive fit, whereby, depending on the embodiment, other accommodation sites for the cable parts can contribute to the force transmission.

Additional force can be introduced, for example, using another chamber that is delineated by a partition on one side and by a rear wall on the other side, and that accommodates a collar of a cable anti-kink means applied on the fiber optic cable. In order to create appropriate shoulders and projections with which a movement limitation for the core housing can be achieved, in one embodiment, the chambers are arranged one after the other in a step-like manner.

The partitions and dividing walls located between the chambers inside the inner core housing are advantageously provided with passage openings. In another embodiment, individual fibers that exit from the end of the fiber optic cable inserted into the connector extend through a chamber of the core housing, with their free ends each connected to a ferrule and bordered by a crimping ring that has a collar on each chamber side and that grasps behind the coupling-side end wall of the chamber. For this purpose, the chamber end wall has ferrule outlet openings whose cross section is dimensioned smaller than the collar of the corresponding ferrule crimping ring. The ferrules themselves are encapsulated in the inner ferrule individual housing so as to be axially unmovable.

This creates the positive connection between the fiber optic cable, the inner core housing, the inner ferrule individual housing and the ferrules.

The inner core housing is accommodated so as to be axially movable in the connector housing, whereby the axial direction designation refers to a linear movement parallel to the axis of the connector extending from the cable insertion end to the ferrule outlet side.

The connector housing in a preferred embodiment has a shaft into which the core housing is inserted. The shaft is dimensioned in such a way that the core housing can be moved inside the connector housing in the axial direction, whereby the shaft is dimensioned in such a way that its inner walls that extend crosswise to the axis direction function as a stop for the axial movement of the core housing inside the connector housing.

Moreover, in a preferred embodiment, the coupling-side end of the connector housing has a double shaft in which two adjacently arranged ferrules are accommodated. The outer ferrule individual housings are movement-coupled with the connector housing, whereby a positive connection is most advantageous.

In a preferred embodiment of the invention, a cap can be placed as a protective sleeve over the connector housing in order to protect the connector housing from being accessed and from being unplugged from the counter-coupling. The cap is provided with retention means that can be clipped or hooked to the inner core housing, so that the cap follows the movement of the core housing. Additional advantageous embodiments of the invention are described in the subordinate claims. The cap can only be removed by means of an unlocking tool.

In a preferred embodiment, the connector housing, the inner core housing and the cap each consist of an upper and lower shell, whereby the upper and the lower shells are each essentially identical.

Brief description of the drawing in which the following is shown:

FIG. 1 a top view of a connector according to the invention, with the upper shells of the connector housing and of the core housing removed with a counter-coupling according to a preferred embodiment of the invention, FIG. 2 a top view of a connector according to the invention, with a cap, with the upper shells removed, according to a preferred embodiment of the invention, FIG. 3 a top view of a connector according to the invention, with a cap, with the upper shells removed and with an engaging unlocking tool according to a preferred embodiment of the invention, FIG. 4 a top view of the inner core housing of a connector according to the invention, with the upper shell removed and with the cable inserted, according to a preferred embodiment of the invention, FIG. 5 a top view of the inner core housing of a connector according to the invention, with a cap, with the upper shell removed and with the cable inserted, whereby the connector housing has been left out, according to a preferred embodiment of the invention, FIG. 6 a top view of the connector housing with the upper shell removed and with outer ferrule individual housings inserted, according to a preferred embodiment of the invention, FIG. 7 a top view of the inner core housing, with the upper shell removed, according to a preferred embodiment of the invention, FIG. 8 a rear view of the core housing according to a preferred embodiment of the invention, FIG. 9 a front view of the core housing according to a preferred embodiment of the invention, FIG. 10 a top view of the connector housing, with the upper shell removed, according to a preferred embodiment of the invention, FIG. 11 a rear view of the connector housing according to a preferred embodiment of the invention, FIG. 12 a front view of the connector housing according to a preferred embodiment of the invention, FIG. 13 a top view of the cap with the upper shell removed, according to a preferred embodiment of the invention, FIG. 14 a rear view of the cap according to a preferred embodiment of the invention, FIG. 15 a front view of the cap according to a preferred embodiment of the invention, FIG. 16 a perspective view of a connector according to the invention, with the upper shells of the connector housing and of the inner core housing removed, according to another embodiment of the invention, FIG. 17 a top view of the connector according to FIG. 16, with the upper shells of the connector housing and of the inner core housing removed, FIG. 18 a perspective view of the inner core housing of a connector according to FIG. 16, with the upper shell removed, FIG. 19 a perspective view of the connector housing according to FIG. 16, with the upper shell removed, FIG. 20 a perspective view of the cap according to FIG. 16, with the upper shell removed.

WAYS TO CARRY OUT THE INVENTION

FIGS. 1 and 15 show preferred embodiments of the invention. First of all, the connector and housing parts are explained according to a first embodiment of the invention with reference to FIGS. 7 to 15, before their functional interaction is described with reference to FIGS. 1 to 6.

FIG. 7 shows the inner core housing 24 in a top view with the upper housing shell removed. The inner core housing 24 is arranged inside the connector housing 2 (FIG. 10) so that it can be moved in the axial direction along a second movement path d2, which is typically about 5 mm. The inner core housing 24 is advantageously divided into chambers, namely, a first chamber 28, a second chamber 27, a third chamber 26 and a fourth chamber 25, which each have a rectangular surface area. The chamber 28 is delineated in the axial direction by an end wall 29 and a chamber wall 38 and laterally by outer walls 75, 76. On three walls of the first chamber 28, there are snap hooks 77, 78, 79 that engage with corresponding counterparts of the upper shell of the inner core housing and that hold the two housing shells together.

The first chamber 28 is followed by a narrower and tighter second chamber 27, which is delineated by the chamber wall 38, by the parallel dividing wall 40 and by the side walls 86, 87. The second chamber 27 is followed by a third chamber 26, which is delineated by the dividing wall 40 on the one hand and by a partition 44 on the other hand. The lateral delineations of the third chamber 26 are formed by side walls 55, 56 on whose outsides there are retention elements 53, 54 whose mechanisms of action will be discussed in greater detail below. Positioned on the insides of the side walls 55, 56, there are additional snap hooks 88, 89 that likewise engage with corresponding counter-elements of the upper shell of the inner core housing.

A fourth chamber 25 of the inner core housing 24 is delineated by the side walls 55, 56, by the partition 44 and by a back wall 46. Whereas the third chamber 26 and the fourth chamber 25 have the same width, the second chamber 27 is wider and the first chamber 28 is even wider than that, so that the chambers 28, 27 and 26 are arranged one behind the other in a stepped manner in whose transition areas shoulders 51, 52 are formed. These shoulders 51, 52 are used at least partially as stops for corresponding counter-surfaces in the connector housing 2 (FIG. 10). The back wall 46, the partition 44, the dividing wall 40 and the chamber wall 38 have cut-outs 49, 50, 41, 39 aligned coaxially with respect to each other for the passage of cables or cable parts. The end wall 29 has two openings 34, 35 through which ferrules can exit.

FIG. 8 shows a rear view and FIG. 9 shows a front view of the core housing according to a preferred embodiment of the invention. When the upper shell is put in place, the end wall 29 of the inner core housing 24 has the openings 34, 35 described above.

FIG. 10 shows the connector housing 2 in a top view with the upper shell removed. The connector housing 2 contains a shaft 59 whose inner shape corresponds essentially to the outer contour of the core housing 24 (FIG. 7), and a double shaft 63, 64 that receives the outer ferrule individual housings 17, 18 (FIG. 1). The shaft 59 is divided into two compartments 60, 61 arranged one behind the other, whose transition area has a shoulder 62 that is formed in that the compartment 61 is dimensioned narrower than the compartment 60. At the back end 3, the connector housing 2 is open. The compartment 61 is delineated laterally by double walls 90, 91 and 92, 93, respectively, between each of which there are snap hooks 94, 95 and 96, 97, respectively, in order to secure the upper housing part that is to be put into place. The side walls 90, 91 have recessed grips 113, 114.

The shaft 59 is laterally delineated by side walls 98, 99. Between the shaft 59 and the double shaft 63, 64, crosswise to the side walls 98, 99, there are webs 71, 72, 73 that function in the axial direction as a coupling-side traversing delineation for the inner core housing 24 in the shaft 59. In the opposite axial direction, the shoulder 62 serves as a traversing delineation for the inner core housing 24 in the shaft 59. On the web 72, parallel to the side walls 98, 99, there are two projections 74, 74', which serve as a guide for the ferrule individual housings 17, 18 (FIG. 1) and that are flush with the edges 106, 107 of a crosswise web 108. On the front ends of the walls 98, 99, jutting projections 109, 110 extend in the direction of the crosswise web 108.

FIG. 11 shows a rear view and FIG. 12 shows a front view of the connector housing 2 according to a preferred embodiment of the invention. Once the connector housing 2 has been closed through the placement of the upper shell, two outlet openings 111, 112 (FIG. 12) remain on the face 5 of the connector housing 2.

FIG. 13 shows a top view of the optional cap 81, with the upper shell removed. The cap 81 can be placed over the connector housing as a protective sleeve in order to protect the connector housing from being accessed and to protect it from being unplugged from the counter-coupling. On the inside 66 of its back wall 82, the cap 81 has retention means 67, 68 facing the coupling side in the form of springy arms that have hooks 69, 70 on their free ends facing inwards, which have the function of grasping behind the retention elements 53, 54 on the outsides 55, 56 of the inner core housing 24 (FIG. 7). The back wall 82 also has a cable opening 83 and tool insertion openings 84, 85 (FIG. 14), through which an unlocking tool 220 (FIG. 3) can be inserted. FIG. 15 shows a front view of the cap 81. Since there is no end wall, the cable opening 83 and the retention means 67, 68 are visible in this view as well.

FIG. 1 shows a top view of a connector according to the invention, with the upper shells of the connector housing and of the core housing removed, with a counter-coupling according to a preferred embodiment of the invention.

Figure 1:
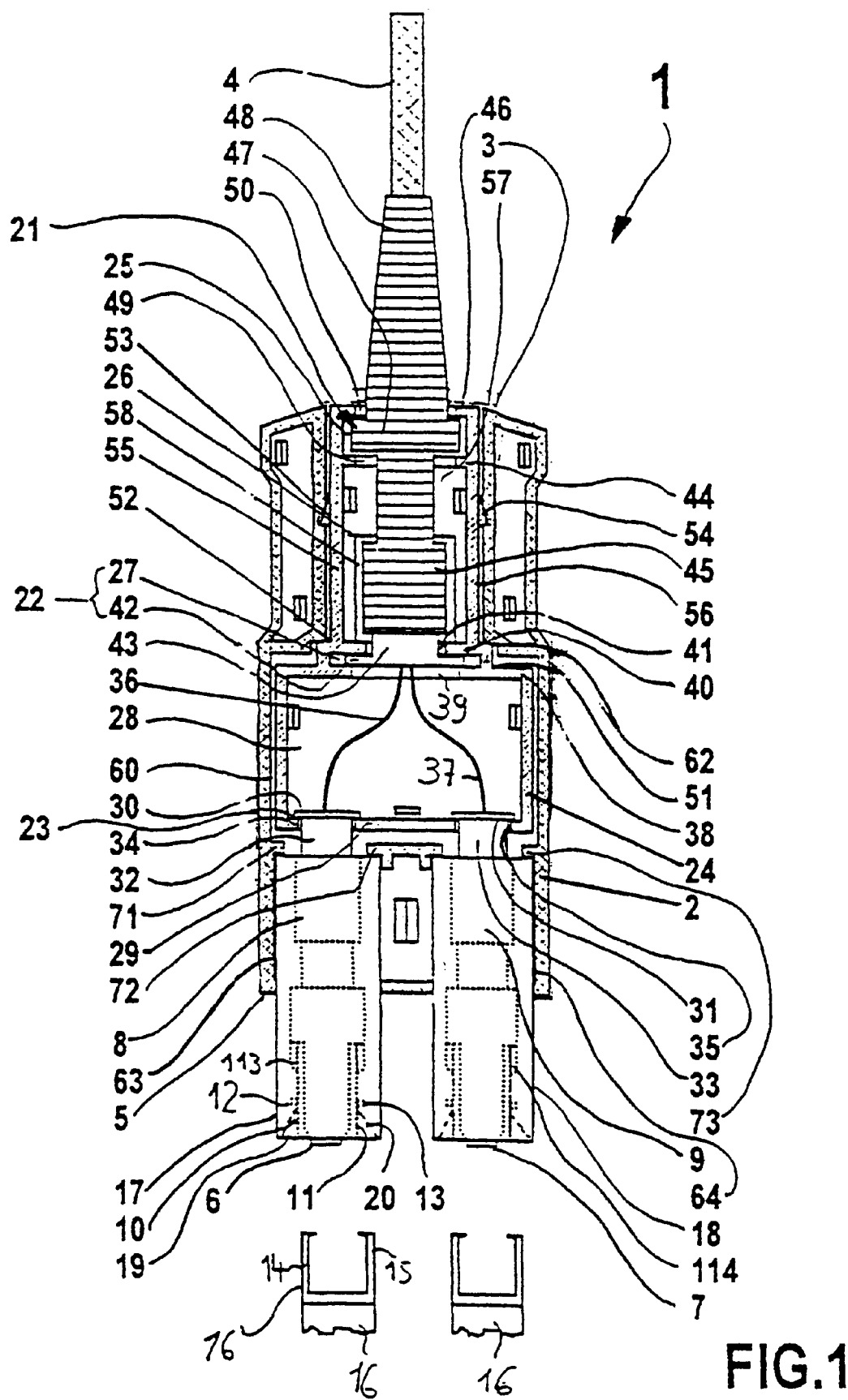
FIGS. 1 to 6 show the mechanical interaction of the connector parts described with reference to FIGS. 7 to 15.

As FIG. 1 shows, the inner individual housings 8, 9, in which the ferrules 6, 7 are encapsulated, are locked with the connector counter-couplings 16. This is done in that the locking means 12, 13 grasp behind the side walls 10, 11 of each inner ferrule individual housing 8, 9 by the locking elements 14, 15 of the connector counter-couplings 16, which are configured in the form of hook-shaped fingers.

The inner ferrule individual housings 8, 9 are accommodated movably in the axial direction in the outer ferrule individual housings 17, 18 in such a way that the inner ferrule individual housings 8, 9 can be moved typically along a first movement path d1 of about 3 mm to 4 mm in the axial direction with respect to the outer ferrule individual housings 17, 18. The side surfaces of the outer ferrule individual housings 17, 18 have openings (not shown) in the area of the locking means 12, 13 so that the fingers 14, 15 of the clasp-shaped part 16' of the connector counter-coupling 16 can grasp behind the locking means 12, 13 on the outsides 10, 11 of the inner ferrule individual housings 8, 9.

The outer ferrule individual housings 17, 18 have unlocking means 19, 20 in the form of wedge-shaped ramps whose tips slide under each of the projections 113, 114 arranged on the ferrule individual housings 17, 18, when these are pulled away towards the back, that is to say, away from the connector counter-coupling 16, as a result of pulling on the connector housing 2 with which the outer ferrule individual housings 17, 18 are movement-coupled. This function, which already exists in the state of the art, continues to be ensured within the scope of the invention so that the connector 1 can be unplugged from the connector counter-coupling 16 in the manner provided in the state of the art.

In contrast, if the fiber optic cable 4 is improperly pulled, then, according to the invention, an unplugging protection means comes into action, whose mechanism of operation will be explained below. The fiber optic cable 4 is inserted into the connector 1 and, according to the invention, only connected in a movement-coupled manner with the inner core housing 24. Although it is also possible to create a frictional connection between the functional parts within the scope of the invention, a positive connection has proven to be very advantageous. The cable end is provided with an anti-kink means 48 in the insertion area of the connector 1 and this anti-kink means 48 with its collar 47 is accommodated in the fourth chamber 25. Depending on the chamber depth and the collar thickness, there is already a first movement-coupled connection 21 here. The third chamber 26 holds the cable crimping ring 45 whose crimping sleeve 43 with its collar 42 is accommodated in the chamber 27 in a form-fitting manner, thus creating a second movement-coupled connection 22. For this purpose, the openings 41 in the dividing wall 40 and the opening 39 in the chamber wall 38 are each dimensioned smaller than the collar 42 that is accommodated in the second chamber 27. Likewise, the opening 49 in the partition 44 and the opening 50 in the back wall 46 are dimensioned smaller that the collar 47 that is accommodated in the first chamber 25.

The individual fibers 36, 37 emerge from the crimping sleeve 43. They extend through the chamber 28 and are joined with the ferrules 6, 7. With their collars 30, 31, the crimping rings 32, 33, while forming a third movement-coupled connection 23, grasp behind the end wall 29 of the first chamber 28 and protrude from the first chamber 28 through the openings 34, 35 in the direction of the coupling.

If the fiber optic cable 4 is now pulled, this tensile force is then transmitted via the inner core housing 24 onto the inner ferrule individual housings 8, 9. A relative movement between the outer ferrule individual housing 17, 18 and the inner ferrule individual housing 8, 9, which otherwise activates the release mechanism, is ruled out when the fiber optic cable 4 is pulled.

Therefore, according to the invention, a tensile force acting on the fiber optic cable 4 is transmitted via the connection—which is movable with respect to the connector housing 1—onto the inner ferrule individual housings 8, 9 and only from there to the outer ferrule individual housings 17, 18. Thus, the outer ferrule individual housings 17, 18, as a result of the tensile force acting on the fiber optic cable 4, are not moved with respect to the inner ferrule individual housings 8, 9 in the direction of the connector housing 2, so that the lock between the outer ferrule individual housings 17, 18 and the counter-couplings 16 is not released.

In this manner, it is ensured that, when the fiber optic cable 4 is pulled, the movement sequence of the connector parts is prescribed in such a way that the release mechanism between the outer ferrule individual housings 17, 18 and the locking elements 14, 15 of the connector counter-coupling 16 cannot go into action. Therefore, according to the invention, the connector 1 can only be released from the counter-couplings 16 by pulling on the connector housing 2. In contrast, if the fiber optic cable 4 is pulled, assuming normal tensile forces, the connector 2 remains locked and cannot be released from the counter-couplings 16.

Figure 2:
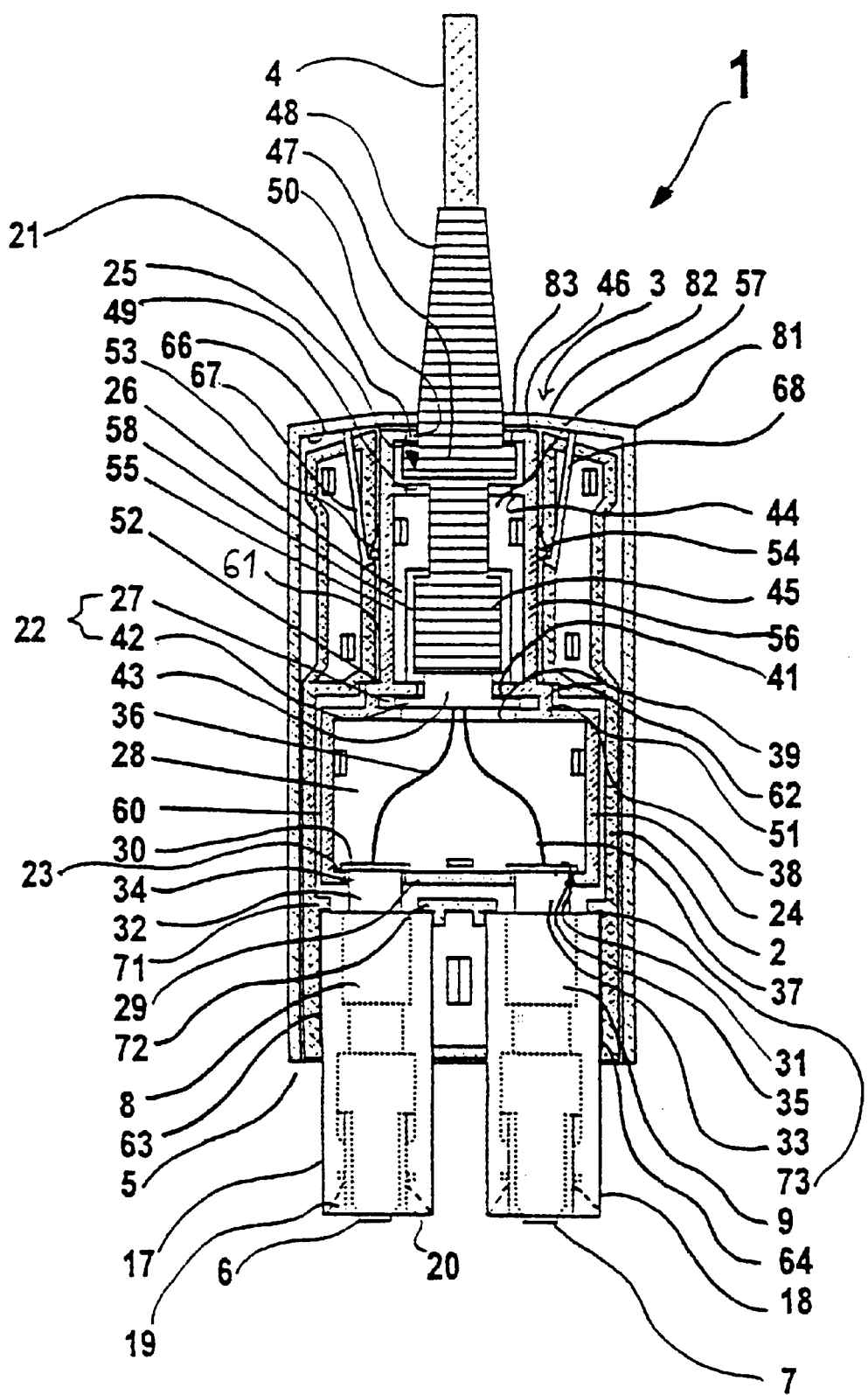

FIG. 2 shows a top view of a connector 1 according to the invention, with a cap 81, with the upper shells removed, according to a preferred embodiment of the invention. The function according to the invention of the cap 81 and its locking with the inner core housing 24 using springy arms 67, 68, hooks 69, 70 and retention elements 53, 54 was already described with reference to FIG. 13.

Figure 3:
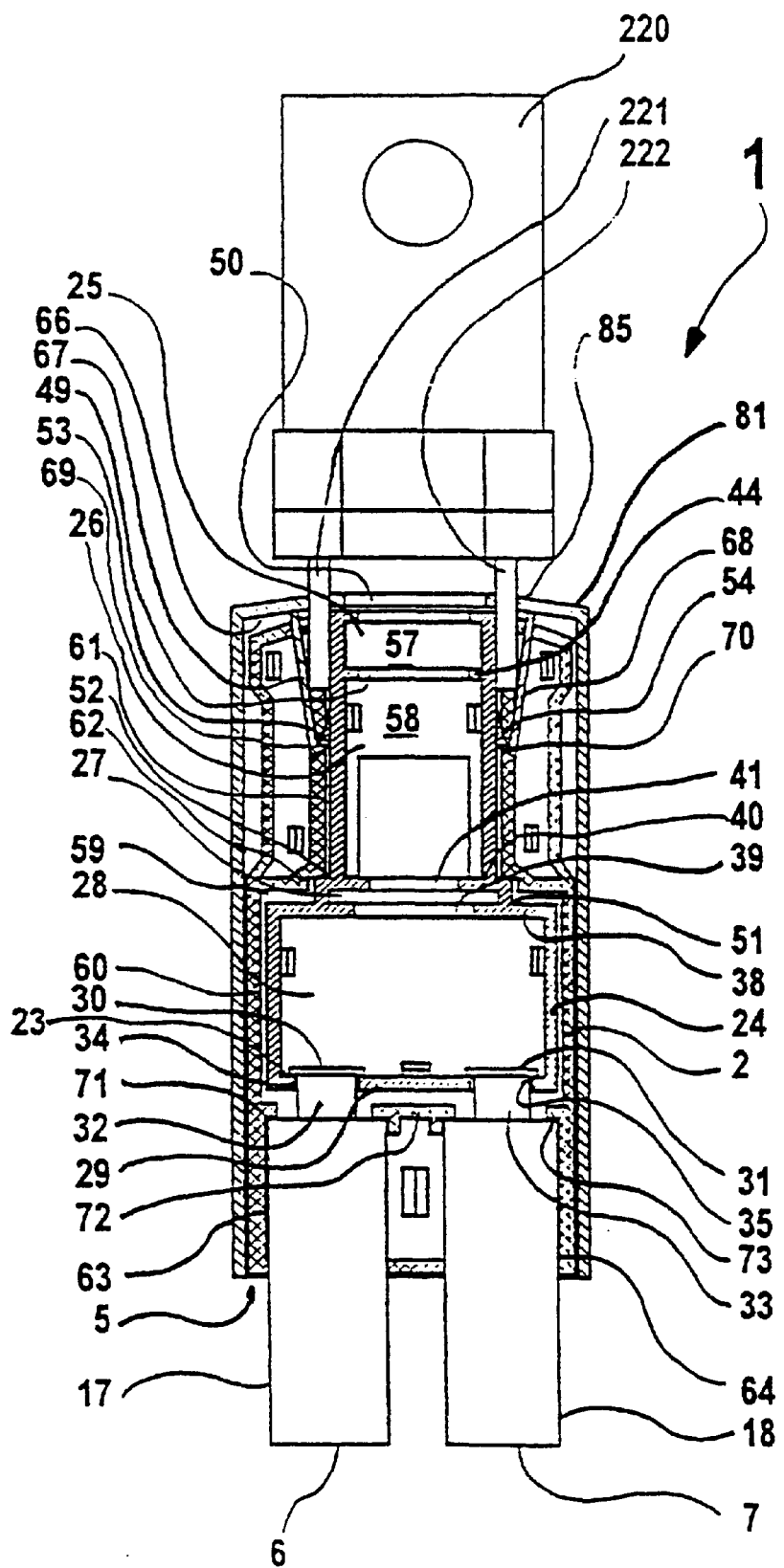

As can be seen from FIG. 3, there are openings 84, 85 (FIG. 14) arranged at both sides of the cable passage opening 83 in the back wall 82 of the cap 81 through which pins 221, 222 of an unlocking tool 220 are inserted into the inside of the connector. When the pins 221, 222 are inserted, the springy arms 67, 68 of the cap 81 are forced outwards so that the hooks 69, 70 are separated from the retention elements 53, 54 on the outsides of the inner core housing 24, as a result of which the cap 81 is released.

Figure 4:
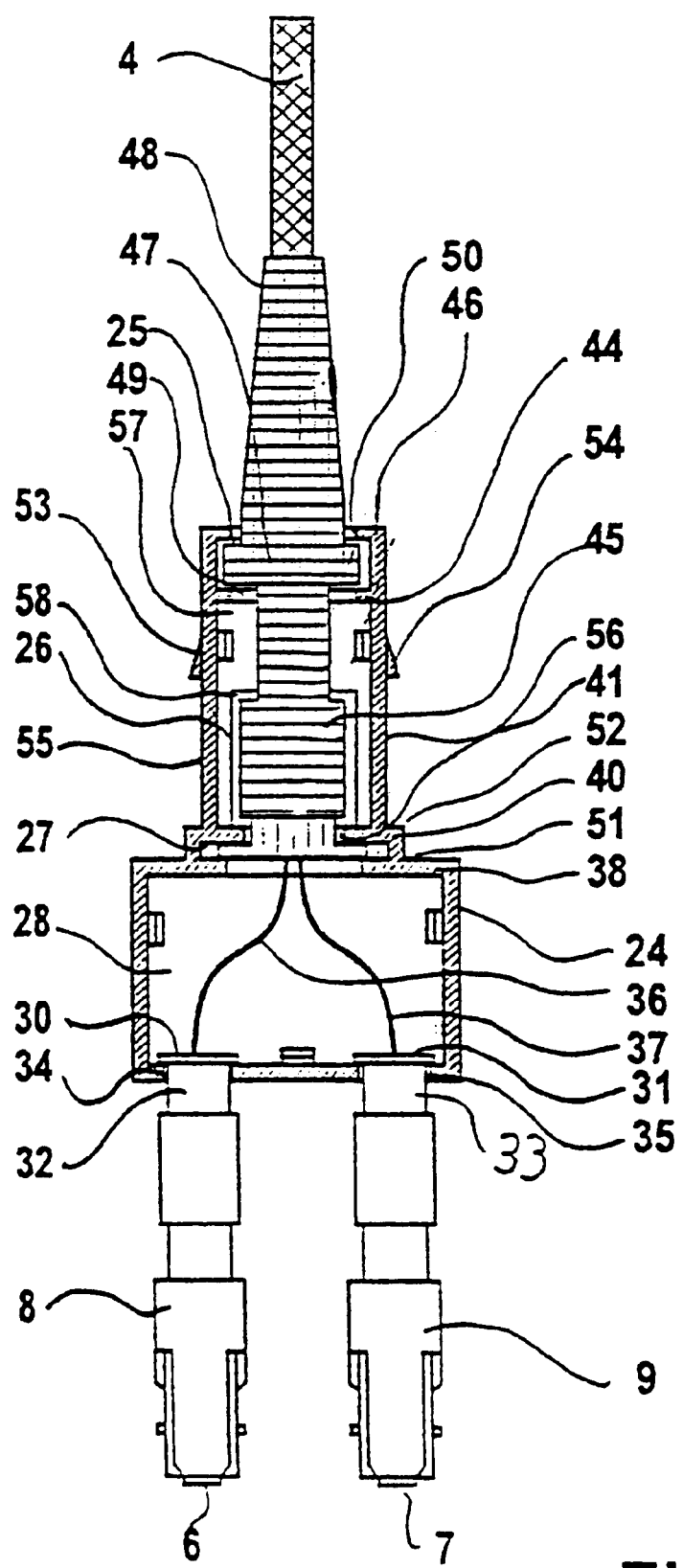

FIG. 4 shows a top view of the inner core housing 24 of a connector 1 according to the invention already described with reference to FIG. 7 with the upper shell removed and with the cable 4 inserted, according to a preferred embodiment of the invention. The individual fibers 36, 37 extend through the chamber 28 and are joined with the ferrules 6, 7. With their collars 30, 31, the crimping rings 32, 33 grasp behind the end wall 29 of the first chamber 28 and protrude from the first chamber 28 through the openings 34, 35 in the direction of the coupling.

Figure 5:
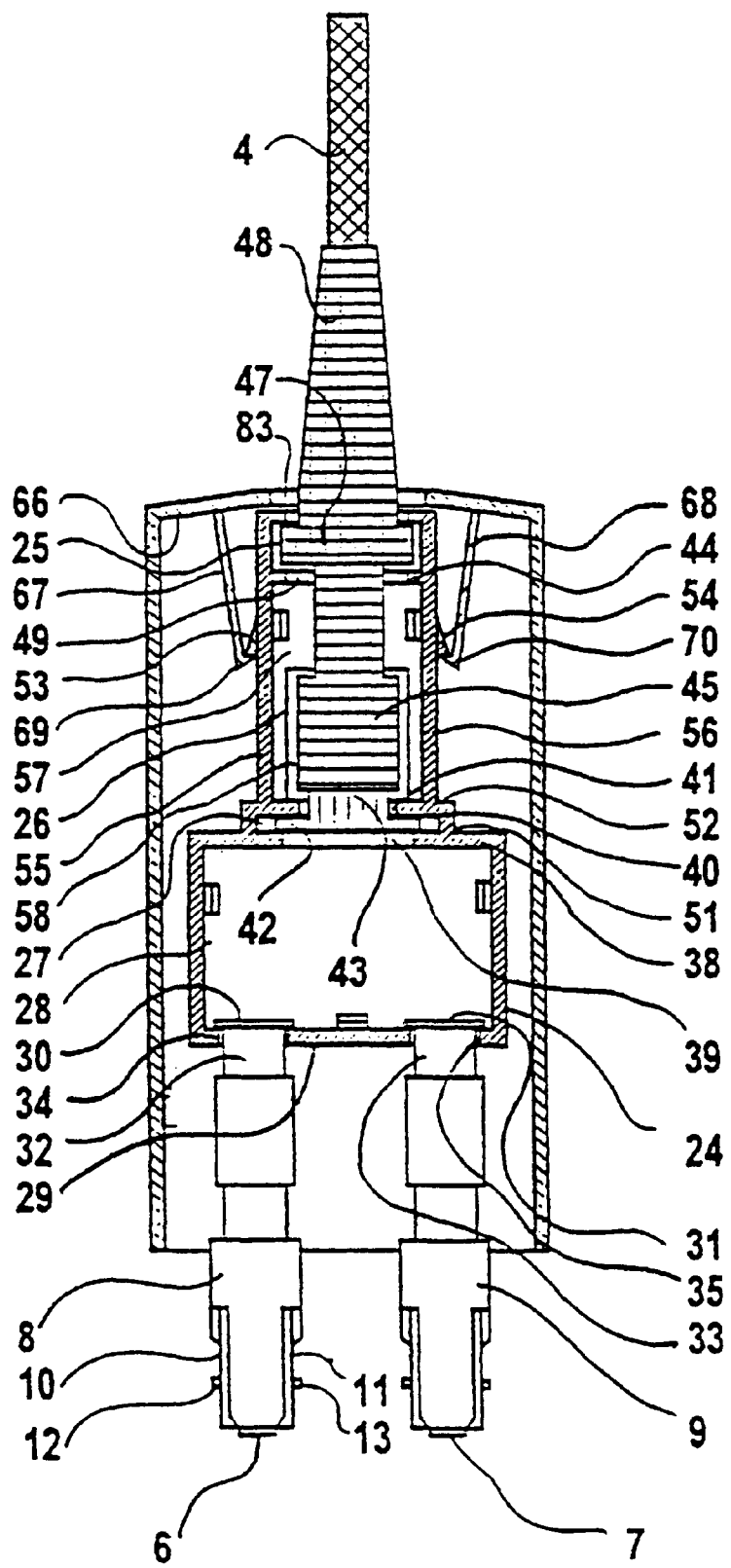

FIG. 5 shows a top view of the inner core housing 24 of a connector 1 according to the invention, with a cap 81, with the upper shells removed and with the cable inserted. The connector housing 2 has been left out in FIG. 5 for the sake of clarity. The function according to the invention of the cap 81 and its locking with the inner core housing 24 by means of springy arms 67, 68, hooks 69, 70 and retention elements 53, 54 arranged on the inner core housing 24 was already described with reference to FIG. 13.

Figure 6:
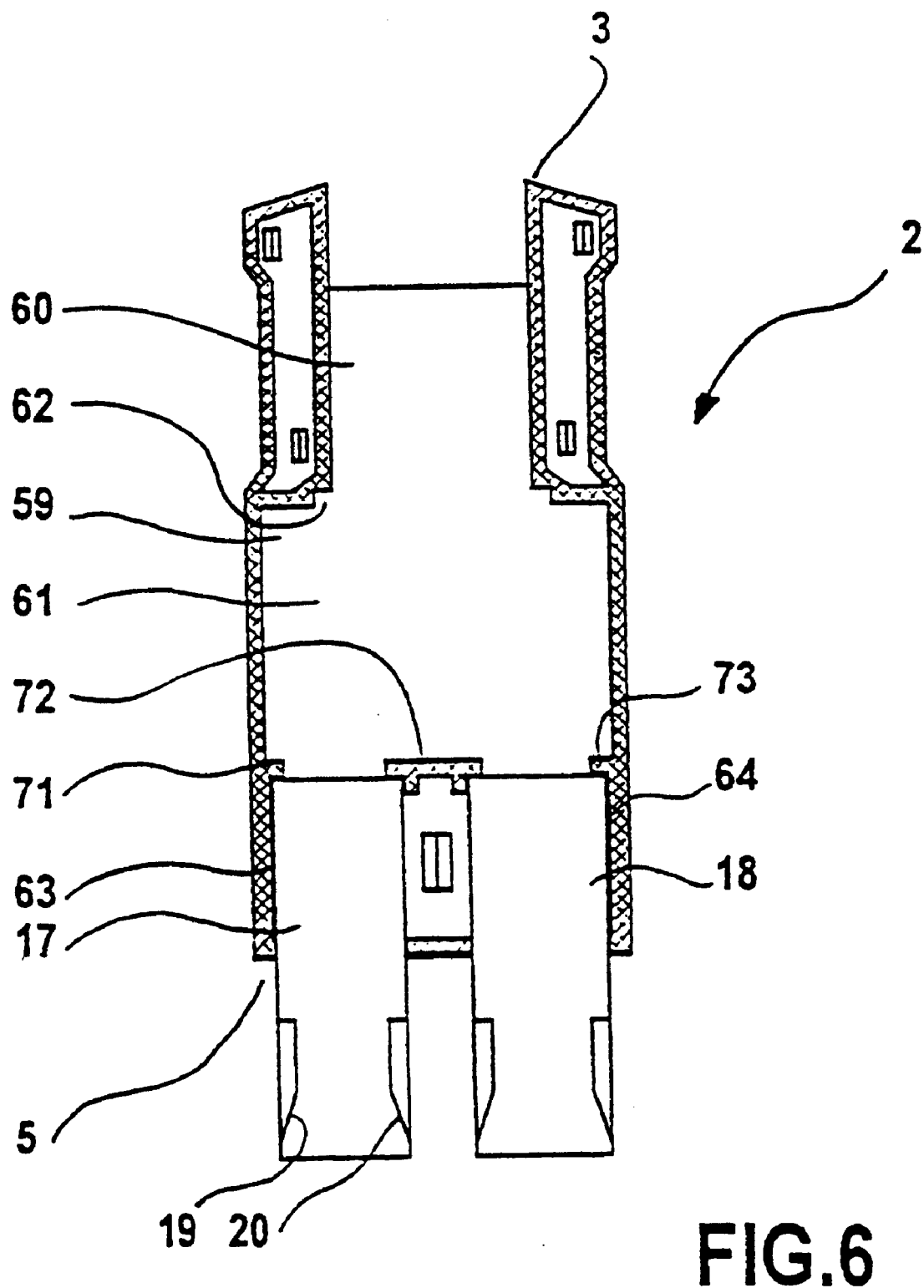

FIG. 6 shows a top view of the connector housing 2 with the upper shell removed and with outer ferrule individual housings 17, 18 inserted, according to a preferred embodiment of the invention. The inner core housing 24 has been left out in FIG. 6 for the sake of clarity.

FIGS. 16 to 20 show another embodiment of the invention that differs from the preferred embodiment shown in FIGS. I to 15 through the locking of the upper shell with the lower shell of the connector housing, of the inner core housing and of the cap. Moreover, the embodiment of the invention described with reference to FIGS. 16 to 20 differs from the preferred embodiment described with reference to FIGS. 1 to 15 through the use of closure pegs and closure grooves, by means of which the appertaining position of each upper shell is secured against crosswise shifting with respect to the lower shell of the connector housing, of the inner core housing and of the cap.

Figure 18:
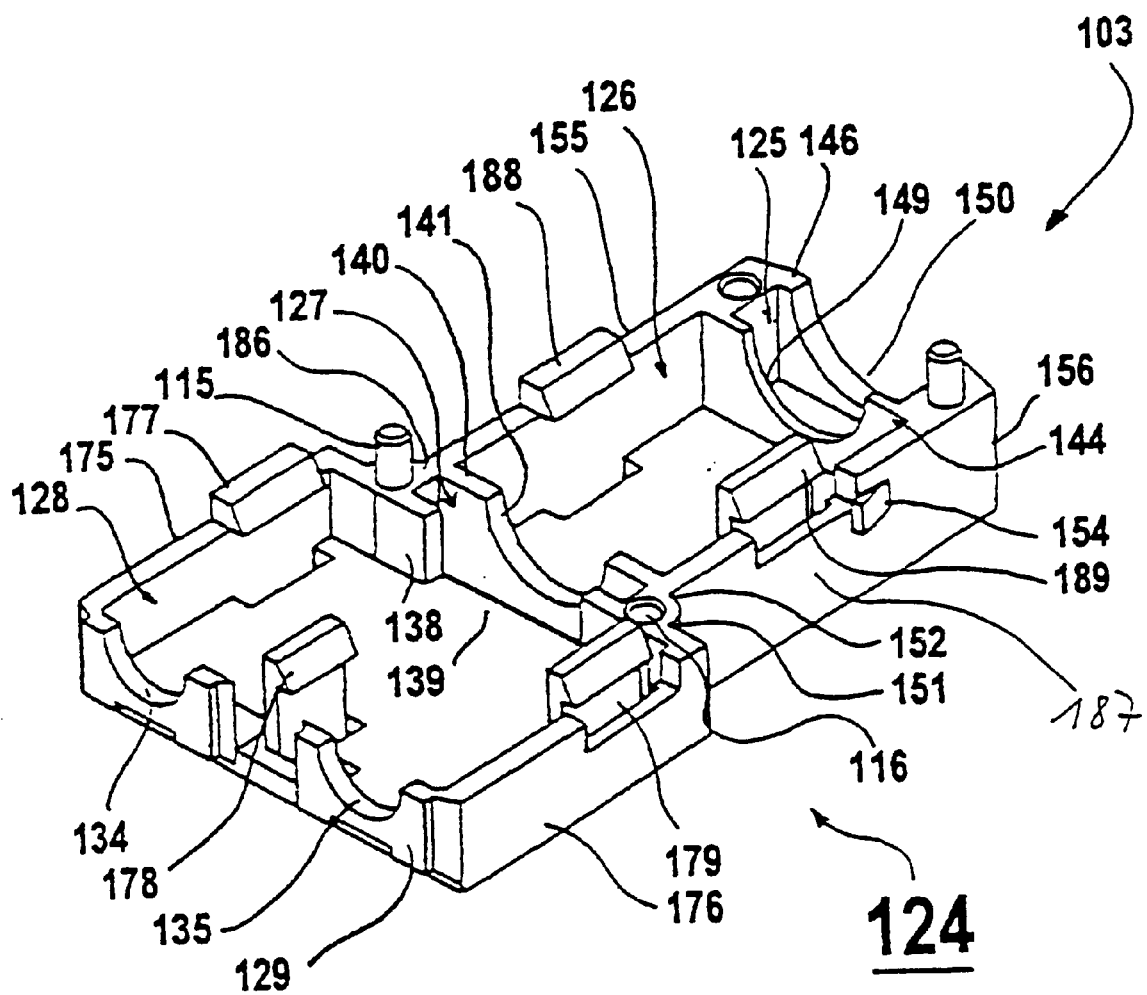

FIG. 18 shows the lower shell of an inner core housing 124 in a perspective view according to another embodiment of the invention. In this embodiment as well, the upper shell is shaped essentially identical to the lower shell. The design of the core housing 124 in this embodiment of the invention is similar to that of the preferred embodiment described with reference to FIGS. 7 to 9. Closure pegs 115 or grooves 116 are arranged on the tops of the rounded-off side walls 186, 187.

Figure 19:
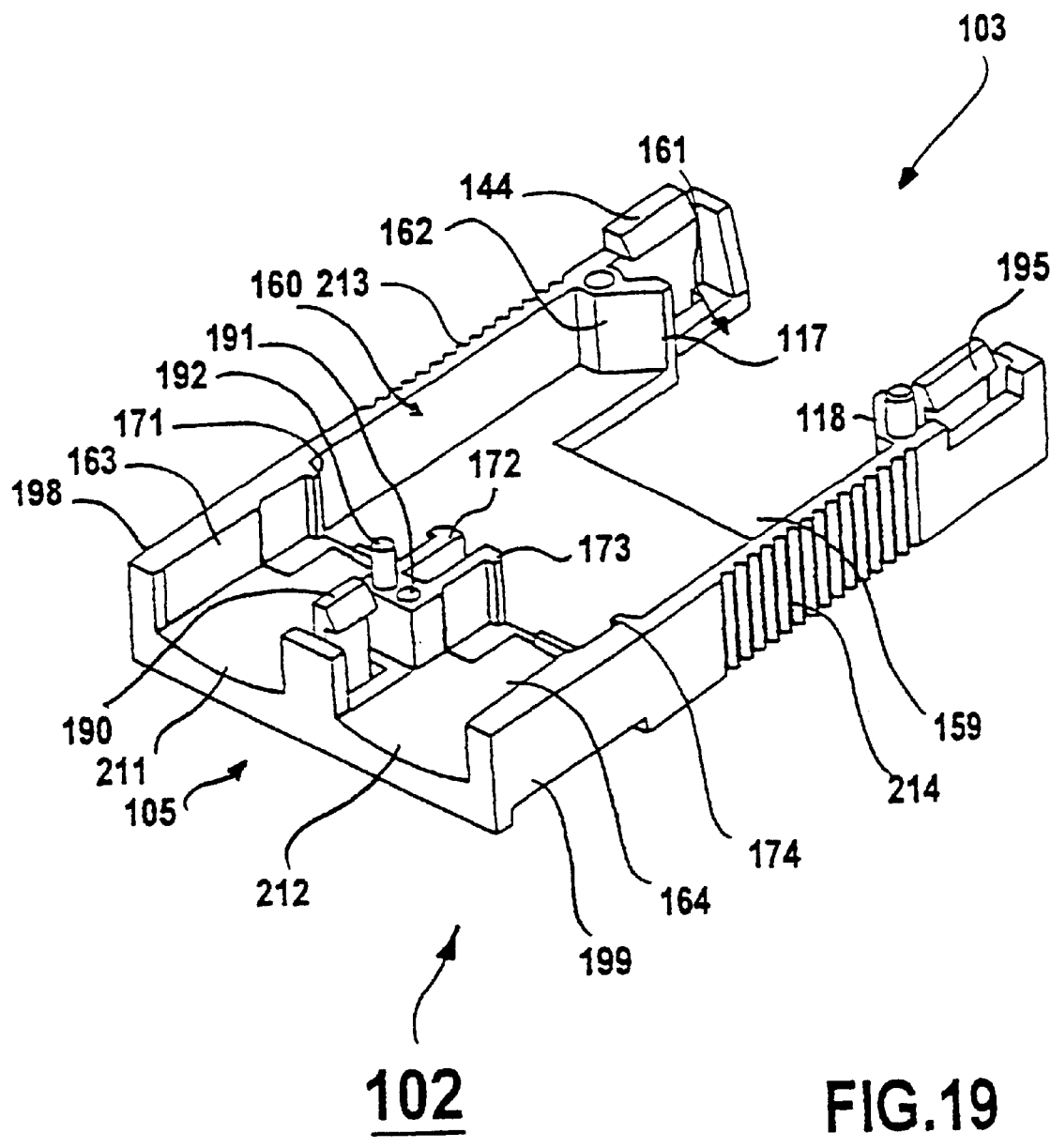

FIG. 19 shows the lower shell of a connector housing 102 in a perspective view according to another embodiment of the invention. In this embodiment as well, the upper shell is shaped essentially identical to the lower shell. The design of the connector housing 102 in this embodiment of the invention is similar to that of the preferred embodiment described with reference to FIGS. 10 to 12. In the end section, there are snap hooks 194, 195 that, together with the snap hook 190 in the area of the double chamber and of the pegs 191 and grooves 192, hold the housing upper part that is to be placed there. The separation between the shaft 159 and the double shaft 163, 164 on the coupling side consists of projections 171, 172, 173, 174 oriented crosswise to the side walls 198, 199. The side walls of the connector housing 2 in this embodiment of the invention are provided with grid-like gripping strips 213, 214.

Figure 20:
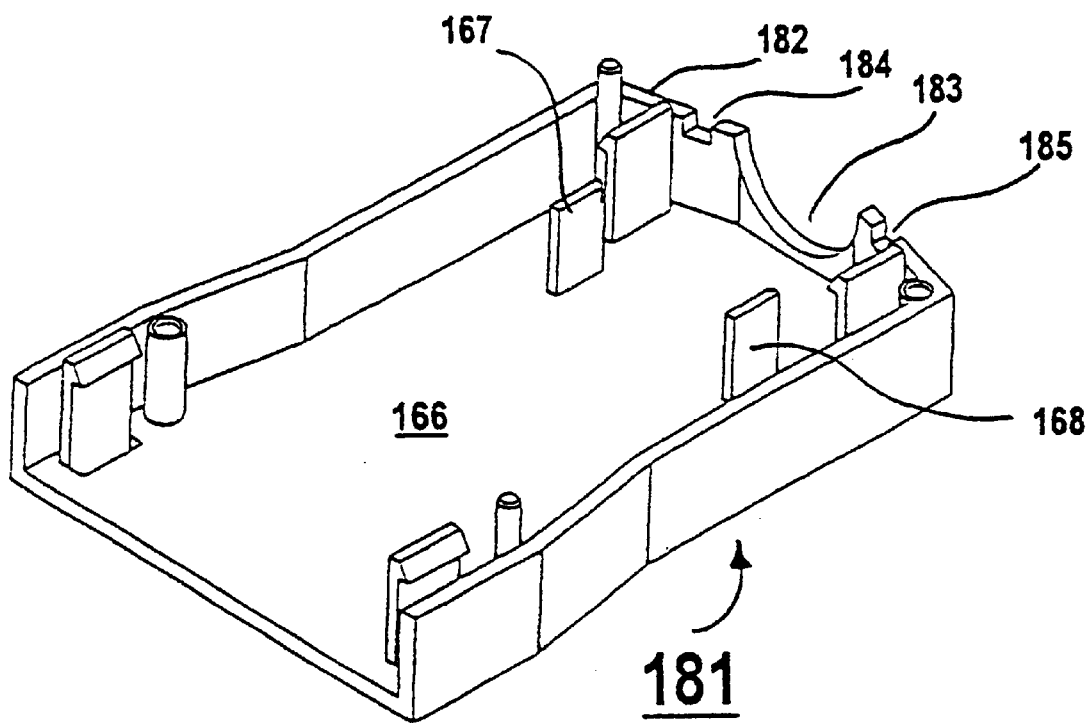

FIG. 20 shows the lower shell of a cap 181 in a perspective view according to another embodiment of the invention. In this embodiment as well, the upper shell is shaped essentially identical to the lower shell. The design of the cap 181 in this embodiment of the invention is similar to that of the preferred embodiment described with reference to FIGS. 13 to 15. The retention means 167, 168 in the embodiment being referred to here, however, are arranged as raised webs that project from the inside of the bottom 166 of the cap 181 and they grasp behind the retention elements 153, 154 of the inner core housing 124 (FIG. 18).

Figure 16:
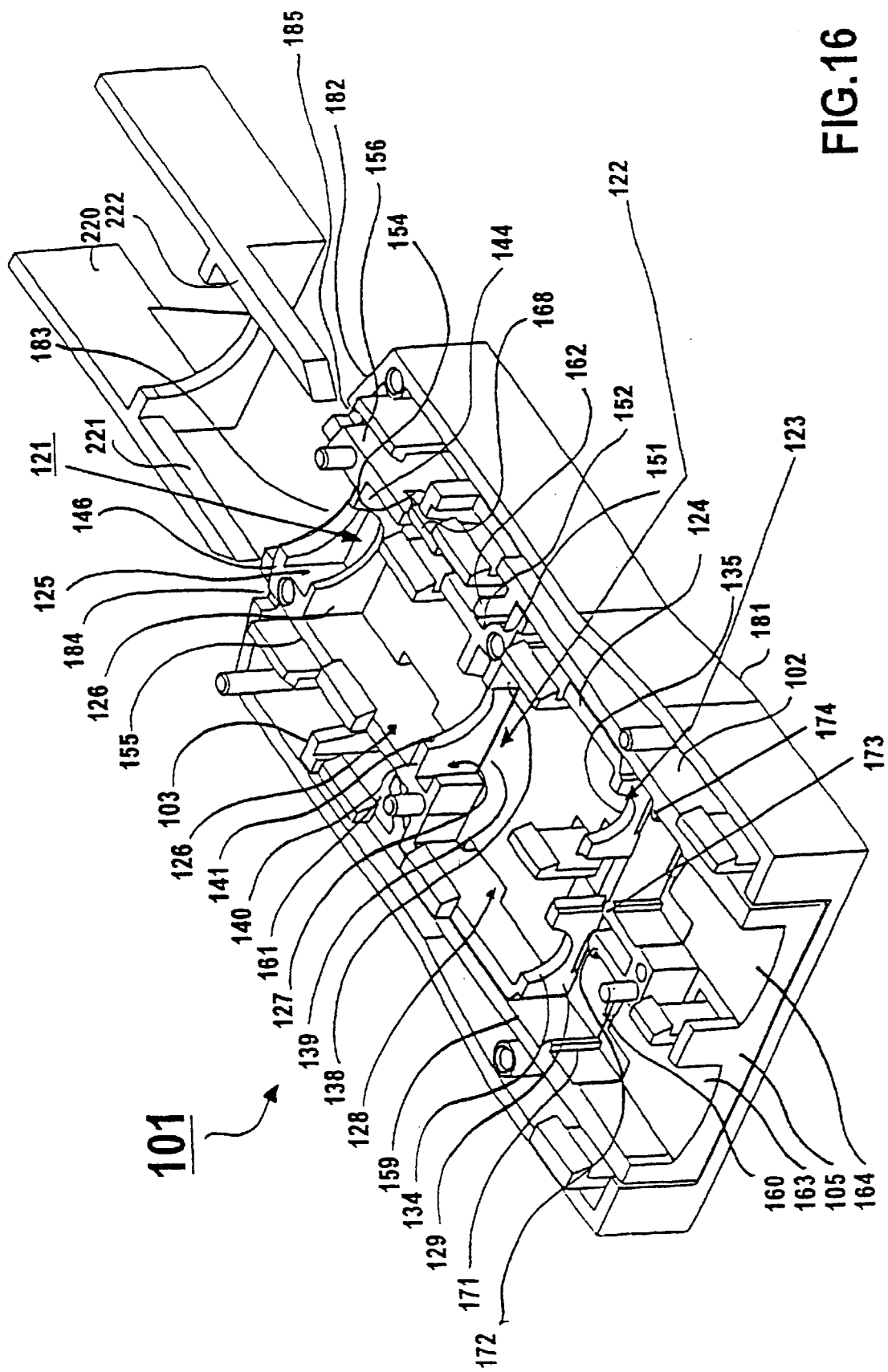
Figure 17:
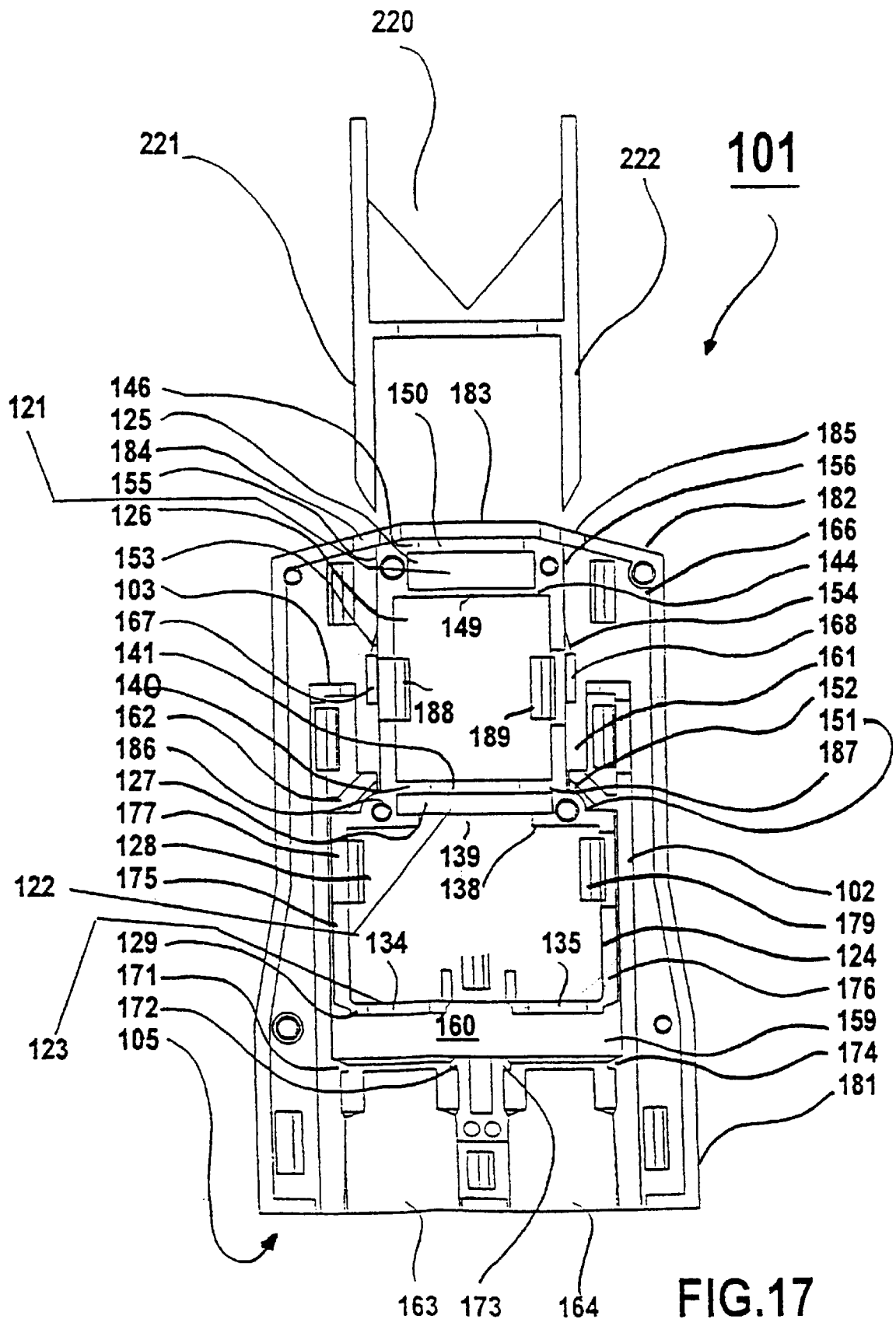

In FIGS. 16 and 17, the connector parts mounted with each other, namely, the inner core housing 124, the connector housing 102 and the cap 181 according to another embodiment of the invention are shown in a perspective view, whereby the corresponding upper housing shells are not shown. The cable parts are not shown in these views. The unlocking between the cap 181 and the inner core housing 124 is effectuated with the tool 220 in the manner already explained with reference to FIGS. 1 to 15.

COMMERCIAL UTILIZATION

The subject matter of the invention can be commercially utilized especially for optical waveguides. The connector has the special feature that it cannot be inadvertently unplugged from the connector counter-coupling with a relatively weak tensile force, since the unlocking mechanism is not detached by merely pulling on the fiber optic cable.

| List of reference numerals: | |
|---|---|
| 1 | connector |
| 2 | connector housing |
| 3 | back end of 2 |
| 4 | fiber optic cable |
| 5 | front end of 2 |
| 6, 7 | ferrule |
| 8, 9 | inner ferrule individual housing |
| 10, 11 | outsides of 8 and 9 |
| 12, 13, 14, 15 | locking means of 8/9 as well as 16 |
| 16 | connector counter-coupling |
| 17, 18 | outer ferrule individual housing |
| 19, 20 | unlocking means on 17/18 |
| 21, 22, 23, 24 | movement-coupled connection between 4 and 8/9 |
| 24 | inner core housing |
| 25, 26, 27, 28 | fourth, third, second, first chamber in 24 |
| 29 | end wall of 24 (coupling-side) |
| 30, 31 | collars on 32 and 33 |
| 32, 33 | crimping ring on 4 |
| 34, 35 | ferrule outlet opening in 29 |
| 36, 37 | individual fibers of 4 |
| 38 | chamber wall in 24 |
| 39 | cutout in 38 |
| 40 | dividing wall in 24 |
| 41 | cutout in 40 |
| 42 | collar of 43 |
| 43 | crimping sleeve |
| 44 | partition |
| 45 | cable crimping sleeve |
| 46 | back wall of 24 |
| 47 | collar of 48 |
| 48 | cable anti-kink means |
| 49 | cutout in 44 |
| 50 | cutout in 46 |
| 51, 52 | shoulder between 28 and 27 and between 27 and 26 |
| 53, 54 | retention element on 24 |
| 55, 56 | side wall of 24 |
| 57 | inner bottom of 26 |
| 58 | groove on 57 |
| 59 | shaft in 2 |
| 60, 61 | compartment of 59 |
| 62 | shoulder between 60, 61 |
| 63, 64 | double shaft of 2 |
| 66 | inside of 82 |
| 67, 68 | retention means in 81 |
| 69, 70 | hooks |
| 71, 72, 73 | web/projection of 102 |
| 75, 76 | outer wall of 28 |
| 77, 78, 79 | snap hooks of 28 |
| 81 | cap |
| 82 | back wall of 81 |
| 83 | cable passage opening in 82 |
| 84, 85 | tool insertion opening in 82 |
| 86, 87 | side wall of 27 |
| 88, 89 | snap hooks in 26 |
| 90, 91, 92, 93 | double wall of 2 |
| 94, 95, 96, 97 | snap hooks |
| 98, 99 | side wall of 2 |
| 101 | connector |
| 102 | connector housing |
| 103 | back end of 102 |
| 105 | front end of 102 |
| 106, 107 | edge |
| 108 | crosswise web |
| 109, 110 | projections on 98 and on 99 |
| 111, 112 | outlet openings in 2 |
| 113, 114 | projection from 8/9 |
| 115 | closure pegs |
| 116 | closure groove |
| 117, 118 | arm |
| 121, 122, 123 | movement-coupled connection |
| 124 | inner core housing |
| 125 | fourth chamber in 124 |

-continued

| List of reference numerals: | |
|---|---|
| 126 | third chamber in 124 |
| 127 | second chamber in 124 |
| 128 | first chamber in 124 |
| 129 | end wall of 124 |
| 134, 135 | ferrule outlet opening of 124 |
| 138 | chamber wall |
| 139 | cutout in 138 |
| 140 | dividing wall in 124 |
| 141 | cutout in 140 |
| 144 | partition |
| 146 | back wall of 124 |
| 149 | cutout in 144 |
| 150 | cutout in 146 |
| 151, 152 | shoulders |
| 153, 154 | retention element |
| 155, 156 | sidewall of 124 |
| 159 | shaft |
| 160, 161 | compartment |
| 162 | shoulder |
| 163, 164 | double shaft |
| 166 | bottom inside of 181 |
| 167, 168 | retention means of 181 |
| 171, 172, 173, 174 | web/projection |
| 175, 176 | outside wall of 124 |
| 177, 178, 179 | snap hooks of 124 |
| 181 | cap |
| 182 | back wall of 181 |
| 183 | cable passage opening in 182 |
| 184, 185 | tool insertion opening in 182 |
| 186, 187 | wall of 124 |
| 188, 189 | snap hooks in 126 |
| 190, 194 | snap hooks |
| 191 | peg |
| 192 | groove |
| 198, 199 | side wall of 102 |
| 211, 212 | openings in 102 |
| 213, 214 | gripping strip on 102 |
| 220 | tool |
| 221, 222 | pin of 220 |

What is claimed is:

1. A connector (1, 101) for optical wave guides comprising a connector housing (2, 102) having a cable insertion end (3, 103) and having a opposite end;

a fiber optic cable (4) is inserted into the connector housing (2,102) through the cable insertion end;

outsides of a housing (10, 11);

an inner ferrule individual housing (8, 9) having locking means (12, 13) on the outsides of the housing (10, 11);

ferrules (6, 7) exiting at the opposite end (5, 105), which ferrules (6, 7) are each encapsulated in the inner ferrule individual housing (8, 9);

locking means (12, 13) being had by the inner ferrule individual housing (8,9), on the outsides of the housing (10, 11);

a connector coupling (16);

an outer ferrule individual housing (17, 18);

a locking counter element (14, 15) disposed at the connector coupling (16), wherein each of the locking means (12, 13) is capable of interacting with the locking counter-element (14, 15) of the connector counter-coupling (16) in such a way that a lock can be effectuated between the inner ferrule individual housing (8, 9) and the locking counter-element (14, 15) of the connector counter-coupling (16), whereby the inner ferrule individual housings (8, 9) are each held in the outer ferrule individual housing (17, 18) and are movable with respect to the outer ferrule individual housing (17, 18) in a direction parallel to an axis of the fiber optic cable (4) by a first movement path d1, said outer ferrule individual housing (17, 18) being accommodated in the connector housing (2, 102) such that said outer ferrule individual housing (17, 18) is movement-coupled and has unlocking means (19, 20);

a lock engaged by the unlocking means (19, 20), wherein the lock can be released by axially moving the outer ferrule individual housing (17, 18) with respect to the inner ferrule individual housing (8, 9) in the direction of the cable insertion end (3, 103), whereby between the fiber optic cable (4) and the inner ferrule individual housing (8, 9), there is a movement-coupled connection (21, 22, 23, 121, 122, 123) that does not allow relative movements between the fiber optic cable and the inner ferrule individual housing and that can be moved with respect to the connector housing (2, 102).

2. The connector according to claim 1 wherein the movement-coupled connection (21, 22, 23, 121, 122, 123) between the fiber optic cable (4) and the inner ferrule individual housing (8, 9) is a positive connection, and wherein the inner core housing (24, 124) consists of two shells that are detachably connected to each other; and wherein the movement path in the outer ferrule individual housing (17, 18) for the inner ferrule individual housing (8, 9) that can be moved therein in a direction parallel to the fiber optic cable (4) is the same as or smaller than the movement path in the connector housing (2, 102) for the core housing (24, 124) accommodated therein and that is movable therein in this direction.

3. The connector according to claim 1 wherein the movement-coupled connection (21, 22, 23, 121, 122, 123) between the fiber optic cable (4) and the inner ferrule individual housing (8, 9) is a frictional connection and wherein the connector housing (2, 102) consists of two shells that are releasably connected to each other.

4. The connector according to claim 1 further comprising an inner core housing (24, 124) accommodated in the connector housing (2, 102), wherein the inner core housing (24, 124) is movable in the direction parallel to the axis of the fiber optic cable (4), wherein the fiber optic cable (4) and the ferrules (6, 7) are bordered in a form-fitting manner by the inner core housing (24, 124) in such a way that a tensile force exerted on the fiber optic cable (4) is transmitted via the inner core housing (24, 124) onto the ferrules (6, 7).

5. The connector according to claim 4 wherein the inner core housing (24, 124) has a first chamber (28, 128) with an end wall (29, 129) on the coupling side, whereby each ferrule (6, 7) is bordered by a crimping ring (32, 33), each of which has a collar (30, 3 1) that grasps behind the end wall (29, 129) on the coupling side through openings (34, 35) arranged in said end wall (29, 129);

wherein the inner core housing (24, 124) has a second chamber (27, 127) in which a collar (42) of a cable-crimping insert (43) attached to the fiber optic cable (4) is accommodated in a form-fitting manner;

wherein the inner core housing (24, 124) has a third chamber (26, 126) in which a cable-crimping sleeve (45) attached to the fiber optic cable (4) is accommodated in a form-fitting manner;

wherein the inner core housing (24, 124) has a fourth chamber (25, 125) in which a collar (47) of a cable anti-kink means (48) attached to the fiber optic cable (4) is accommodated in a form-fitting manner;

wherein the first chamber (28, 128), the second chamber (27, 127) and the third chamber (26, 126) are arranged one behind the other in a stepped manner in decreasing width, whereby shoulders (51, 52, 151, 152) are formed between them which serve as stops for corresponding counter-surfaces in the connector housing (2).

6. The connector according to claim 4 further comprising a shaft (59, 159) disposed in the connector housing (2, 102), wherein the shaft (59, 159) is suitable for accommodating the inner core housing (24, 124), whereby the inner core housing (24, 124) is movably accommodated in said shaft (59, 159) in the direction parallel to the axis of the fiber optic cable (4); and wherein the shaft (59, 159) is divided into two compartments (60, 61, 160, 161) arranged one behind the other, whereby a shoulder is arranged between the compartments (60, 61, 160, 161).

7. The connector according to claim 4 further comprising a double shaft (63, 64, 163, 164) disposed on a coupling-side end of the connector housing (2, 102), wherein the double shaft (63, 64, 163, 164) accommodates the outer ferrule individual housings (17, 18); and wherein a traversing delineation for the inner core housing (24, 124) is created in the connector housing (2, 102) in a direction parallel to the axis of the fiber optic cable (4), which traversing delineation for the inner core housing (24, 124) is formed by a shoulder (62, 162) and by the webs or projections (71, 72, 73, 171, 172, 173, 174) that delineate the shaft (59, 159); and wherein the connector is additionally furnished with a cap (81, 181), wherein the cap is formed to furnish an unplugging protection means, which cap is placed over the connector (1, 101) like a protective sleeve and wherein retention means (67, 68, 167, 168) are arranged on the cap (81, 181), which retention means (67, 68, 167, 168) interact with the retention elements (53, 54, 153, 154) attached to the outside of the inner core housing (24, 124) in such a way that the cap (81, 181) is locked to the inner core housing (24, 124), whereby a tensile force exerted on the cap (81, 181) can be transmitted onto the inner core housing (24, 124).

8. The connector according to claim 1 further comprising retention means (67, 68, 167, 168) formed as springy arms (67, 68) to which hooks (69, 70) are attached; and a cap (81, 181) consisting of two shells that are detachably connected to each other.

9. The connector according to claim 1 further comprising retention means (67, 68, 167, 168) formed as raised webs (167, 168) that project from the inside of a bottom (166) of a cap (181); and wherein the cap (81, 181) can be released again from an inner core housing (24, 124) by means of an unlocking tool (220), which releases the retention means (67, 68, 167, 168) of the cap (81, 181) from retention elements (53, 54, 153, 154).

10. A connector (1, 101) for optical wave guides, with a connector housing (2, 102) at whose cable insertion end (3, 103) a fiber optic cable (4) is inserted and at whose opposite end (5, 105) ferrules (6, 7) exit, which are each encapsulated in an inner ferrule individual housing (8, 9) which, on the outsides of the housing (10, 11), has locking means (12, 13), each of which is capable of interacting with a locking counter-element (14, 15) of a connector counter-coupling (16), in such a way that a lock can be effectuated between the inner ferrule individual housing (8, 9) and the locking counter-element (14, 15) of the connector counter-coupling (16), whereby the inner ferrule individual housings (8, 9) are each held in an outer ferrule individual housing (17, 18) and are movable with respect thereto in the direction parallel to the axis of the fiber optic cable (4) by a first movement path d1, said ferrule individual housing (17, 18) being accommodated in the connector housing (2, 102) such that it is movement-coupled and has unlocking means (19, 20) by means of which the lock can be released by axially moving the outer ferrule individual housing (17, 18) with respect to the inner ferrule individual housing (8, 9) in the direction of the cable insertion end (3, 103), whereby between the fiber optic cable (4) and the inner ferrule individual housing (8, 9), there is a movement-coupled connection (21, 22, 23, 121, 122, 123) that does not allow relative movements between the fiber optic cable and the inner ferrule individual housing and that can be moved with respect to the connector housing (2, 102).

11. The connector according to claim 10, wherein
the movement-coupled connection (21, 22, 23, 121, 122, 123) between the fiber optic cable (4) and the inner ferrule individual housing (8, 9) is a positive connection. and
wherein the connector housing (2, 102) consists of two shells that are releasably connected to each other.

12. The connector according to claim 10, wherein
the movement-coupled connection (21, 22, 23, 121, 122, 123) between the fiber optic cable (4) and the inner ferrule individual housing (8, 9) is a frictional connection; and
wherein the inner core housing (24, 124) consists of two shells that are detachably connected to each other; and
wherein the movement path in the outer ferrule individual housing (17, 18) for the inner ferrule individual housing (8, 9) that can be moved therein in a direction parallel to the fiber optic cable (4) is the same as or smaller than the movement path in the connector housing (2, 102) for the core housing (24, 124) accommodated therein and that is movable therein in this direction.

13. The connector according to claim 10 wherein in the connector housing (2, 102), an inner core housing (24, 124), which is movable in the direction parallel to the axis of the fiber optic cable (4), is accommodated in which the fiber optic cable (4) and the ferrules (6, 7) are bordered in a form-fitting manner in such a way that a tensile force exerted on the fiber optic cable (4) is transmitted via the inner core housing (24, 124) onto the ferrules (6, 7).

14. The connector according to claim 13, wherein
the inner core housing (24, 124) has a first chamber (28, 128) with an end wall (29, 129) on the coupling side, whereby each ferrule (6, 7) is bordered by a crimping ring (32, 33), each of which has a collar (30, 31) that grasps behind the end wall (29, 129) on the coupling side through openings (34, 35) arranged in said end wall (29, 129);
wherein the inner core housing (24, 124) has a second chamber (27, 127) in which a collar (42) of a cable-crimping insert (43) attached to the fiber optic cable (4) is accommodated in a form-fitting manner;
wherein the inner core housing (24, 124) has a third chamber (26, 126) in which a cable-crimping sleeve (45) attached to the fiber optic cable (4) is accommodated in a form-fitting manner; and
wherein the inner core housing (24, 124) has a fourth chamber (25, 125) in which a collar (47) of a cable anti-kink means (48) attached to the fiber optic cable (4) is accommodated in a form-fitting manner; and
wherein the first chamber (28, 128), the second chamber (27, 127) and the third chamber (26, 126) are arranged one behind the other in a stepped manner in decreasing width, whereby shoulders (51, 52, 151, 152) are formed between them which serve as stops for corresponding counter-surfaces in the connector housing (2).

15. The connector according to claim 13, wherein
the connector housing (2, 102) has a shaft (59, 159) that is suitable for accommodating the inner core housing (24, 124), whereby the inner core housing (24, 124) is movably accommodated in said shaft (59, 159) in the direction parallel to the axis of the fiber optic cable (4); and
wherein the shaft (59, 159) is divided into two compartments (60, 61, 160, 161) arranged one behind the other, whereby a shoulder is arranged between the compartments (60, 61, 160, 161); and
wherein in the connector housing (2, 102), in the direction parallel to the axis of the fiber optic cable (4), a traversing delineation for the inner core housing (24, 124) is created which is formed by the shoulder (62, 162) and by the webs or projections (71, 72, 73, 171, 172, 173, 174) that delineate the shaft (59, 159).

16. The connector according to claim 13, characterized in that,
on its coupling-side end, the connector housing (2, 102) has a double shaft (63, 64, 163, 164) in which the outer ferrule individual housings (17, 18) are accommodated; and
wherein the connector additionally has a cap (81, 181) that can optionally be used as an unplugging protection means, which is placed over the connector (1, 101) like a protective sleeve and on which the retention means (67, 68, 167, 168) are arranged, which interact with the retention elements (53, 54, 153, 154) attached to the outside of the inner core housing (24, 124) in such a way that the cap (81, 181) is locked to the inner core housing (24, 124), whereby a tensile force exerted on the cap (81, 181) can be transmitted onto the inner core housing (24, 124).

17. The connector according to claim 16, wherein
the retention means (67, 68, 167, 168) are springy arms (67, 68) to which hooks (69, 70) are attached; and
wherein the cap (81, 181) can be released again from the inner core housing (24, 124) by means of an unlocking tool (220), which releases the retention means (67, 68, 167, 168) of the cap (81, 181) from the retention elements (53, 54, 153, 154).

18. The connector according to claim 14, characterized in that,
the retention means (67, 68, 167, 168) are raised webs (167, 168) that project from the inside of the bottom (166) of the cap (181); and
wherein the cap (81, 181) consists of two shells that are detachably connected to each other.

* * * * *